(12) United States Patent
Ito

(10) Patent No.: US 10,191,829 B2
(45) Date of Patent: Jan. 29, 2019

(54) SEMICONDUCTOR DEVICE AND FAULT DETECTION METHOD THEREFOR

(71) Applicant: Renesas Electronics Corporation, Kawasaki-shi (JP)

(72) Inventor: Hirohiko Ito, Kawasaki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 389 days.

(21) Appl. No.: 14/803,047

(22) Filed: Jul. 18, 2015

(65) Prior Publication Data
US 2016/0055070 A1    Feb. 25, 2016

(30) Foreign Application Priority Data

Aug. 19, 2014    (JP) .................................. 2014-166781

(51) Int. Cl.
| | |
|---|---|
| G06F 11/00 | (2006.01) |
| G06F 11/30 | (2006.01) |
| G06F 11/22 | (2006.01) |
| G06F 13/40 | (2006.01) |
| G06F 3/16 | (2006.01) |
| H04R 29/00 | (2006.01) |

(52) U.S. Cl.
CPC ............ *G06F 11/3037* (2013.01); *G06F 3/16* (2013.01); *G06F 11/221* (2013.01); *G06F 11/2226* (2013.01); *G06F 11/3027* (2013.01); *G06F 13/4022* (2013.01); *H04R 29/001* (2013.01)

(58) Field of Classification Search
CPC . G06F 3/16; G06F 3/167; G10L 15/20; G11B 19/02; G11B 27/36; G11B 7/005; G10K 11/17833; G10K 11/17881; G10K 2210/3023; G10K 2210/30231; H04R 3/04; H04R 5/04
See application file for complete search history.

(56) References Cited

U.S. PATENT DOCUMENTS 3,188,615 A * 6/1965 Wilcox, Jr. ............ G11B 15/14
332/117
4,360,708 A * 11/1982 Taguchi ................... G10L 19/00
704/207

(Continued)

FOREIGN PATENT DOCUMENTS

| EP | 0 866 389 A2 | 9/1998 |
|---|---|---|
| JP | 2005-292401 A | 10/2005 |
| JP | 2011-251626 A | 12/2011 |

OTHER PUBLICATIONS

Office Action/Communication Pursuant to Article 94(3) EPC in European Application No. 15 177 014.6-1954 dated Oct. 4, 2016.
Extended European Search Report dated Dec. 8, 2015.

*Primary Examiner* — Loan L. T. Truong
(74) *Attorney, Agent, or Firm* — McGinn I.P. Law Group, PLLC

(57) ABSTRACT

According to one embodiment, a semiconductor device includes a memory-transfer control unit that controls data transfer between a memory and a sound unit. A plurality of sound data transfer routes are configured by one memory-transfer control unit and one sound unit. The semiconductor device outputs reproduction sound data via at least one sound data transfer route and acquires at least two pieces of recording sound data on account of one piece of reproduction sound data via at least two sound data transfer routes.

12 Claims, 10 Drawing Sheets

(56) References Cited

U.S. PATENT DOCUMENTS

| | | | | |
|---|---|---|---|---|
| 4,536,886 | A * | 8/1985 | Papamichalis | G10L 19/04 704/207 |
| 5,077,734 | A * | 12/1991 | Ohtsuka | H04J 3/0688 370/509 |
| 5,146,539 | A * | 9/1992 | Doddington | G10L 15/02 704/241 |
| 5,463,714 | A * | 10/1995 | Han | G11B 20/1813 704/226 |
| 5,625,747 | A * | 4/1997 | Goldberg | G10L 15/12 704/231 |
| 5,862,106 | A * | 1/1999 | Washikawa | G10H 1/0091 369/30.13 |
| 5,918,180 | A * | 6/1999 | Dimino | B60R 25/102 340/988 |
| 6,038,683 | A | 3/2000 | Shimamura et al. | |
| 6,085,257 | A * | 7/2000 | Ducaroir | G09G 5/006 345/204 |
| 6,088,601 | A * | 7/2000 | Miyagi | H04B 1/46 455/343.1 |
| 6,092,046 | A * | 7/2000 | Okuda | G10L 19/008 704/212 |
| 6,249,641 | B1 * | 6/2001 | Yokota | G11B 11/10502 375/E7.004 |
| 7,430,158 | B1 * | 9/2008 | Tanner | G11B 27/005 369/47.48 |
| 8,958,571 | B2 * | 2/2015 | Kwatra | G10K 11/178 381/94.1 |
| 2001/0053872 | A1 * | 12/2001 | Zilberman | H04R 25/606 600/25 |
| 2002/0097884 | A1 * | 7/2002 | Cairns | G10K 11/1788 381/71.4 |
| 2002/0135815 | A1 * | 9/2002 | Finn | G06K 7/10881 358/473 |
| 2005/0209719 | A1 * | 9/2005 | Beckert | B60R 16/0315 700/94 |
| 2005/0278110 | A1 * | 12/2005 | Horio | G01C 21/3608 701/532 |
| 2005/0278596 | A1 | 12/2005 | Miyajima et al. | |
| 2006/0114069 | A1 * | 6/2006 | Kojima | H03L 7/087 331/16 |
| 2006/0245305 | A1 * | 11/2006 | Aarts | H04S 1/005 369/1 |
| 2007/0076281 | A1 * | 4/2007 | Uchida | G11B 7/005 359/24 |
| 2008/0060502 | A1 * | 3/2008 | Hasebe | G10H 1/0008 84/609 |
| 2008/0107286 | A1 * | 5/2008 | Nakajima | G10L 15/20 381/110 |
| 2008/0162150 | A1 * | 7/2008 | Ramaswamy | G10L 19/0018 704/500 |
| 2008/0279528 | A1 * | 11/2008 | Takahashi | H04N 5/783 386/248 |
| 2008/0318518 | A1 * | 12/2008 | Coutinho | H04H 20/62 455/3.06 |
| 2009/0097679 | A1 * | 4/2009 | Maeda | H04S 3/008 381/302 |
| 2009/0147903 | A1 * | 6/2009 | Kikuchi | H03L 7/07 375/376 |
| 2009/0251479 | A1 * | 10/2009 | Choi | G06F 3/14 345/581 |
| 2010/0093394 | A1 * | 4/2010 | Hidaka | H04B 3/548 455/557 |
| 2011/0123035 | A1 * | 5/2011 | Pfannenberg | G08B 29/10 381/59 |
| 2011/0293103 | A1 * | 12/2011 | Park | G10K 11/1782 381/57 |
| 2013/0022058 | A1 * | 1/2013 | Akutagawa | H04L 7/041 370/476 |
| 2013/0243225 | A1 * | 9/2013 | Yokota | G10K 11/178 381/300 |
| 2013/0301849 | A1 * | 11/2013 | Alderson | G10K 11/16 381/71.11 |
| 2013/0343571 | A1 * | 12/2013 | Rayala | H04R 3/005 381/92 |
| 2014/0046891 | A1 * | 2/2014 | Banas | G06N 5/022 706/46 |
| 2014/0050332 | A1 * | 2/2014 | Nielsen | H04R 3/005 381/92 |
| 2014/0074482 | A1 * | 3/2014 | Ohno | G06F 3/167 704/275 |
| 2014/0136215 | A1 * | 5/2014 | Dai | G10L 15/22 704/275 |
| 2015/0010158 | A1 * | 1/2015 | Broadley | H04R 29/00 381/58 |
| 2015/0098587 | A1 * | 4/2015 | Aiba | G10L 21/0208 381/94.1 |
| 2016/0309274 | A1 * | 10/2016 | Ma | H03M 3/04 |

* cited by examiner

Fig. 2

SEMICONDUCTOR DEVICE AND FAULT DETECTION METHOD THEREFOR

CROSS-REFERENCE TO RELATED APPLICATIONS

This application is based upon and claims the benefit of priority from Japanese patent application No. 2014-166781, filed on Aug. 19, 2014, the disclosure of which is incorporated herein in its entirety by reference.

BACKGROUND

The present invention relates to a semiconductor device and a fault detection method therefor and relates to, for example, a semiconductor device for performing sound output and sound input and a fault detection method therefor.

In recent years, according to the progress of a sound recognition technique, many techniques for controlling devices with sound have been proposed. When the device control by sound is performed in this way, it is necessary to not only output sound but also accurately capture sound generated on the outside. Therefore, Japanese Unexamined Patent Application Publication No. 2011-251626 and Japanese Unexamined Patent Application Publication No. 2005-292401 disclose examples of sound input and output devices that perform input and output of sound.

A vehicle-mounted device described in Japanese Unexamined Patent Application Publication No. 2011-251626 quickly performs self-diagnosis of speakers and amplifiers mounted on an automobile. More specifically, in Japanese Unexamined Patent Application Publication No. 2011-251626, chime sound emitted from a speaker according to opening of a door is collected by another speaker. In Japanese Unexamined Patent Application Publication No. 2011-251626, a fault in the speakers is detected on the basis of whether the chime sound is collected by the other speaker.

A car navigation device described in Japanese Unexamined Patent Application Publication No. 2005-292401 includes a sound input and output function and diagnoses temporary abnormality of a sound output device. More specifically, in Japanese Unexamined Patent Application Publication No. 2005-292401, when synthetic sound is output from the sound output device, a microphone is operated to capture a sound input signal from a sound input device, sound recognition by an A/D converter and a sound recognizing unit is executed, and a result of the sound recognition and original sound data are compared to determine whether the sound recognition result and the original sound data coincide with each other. In Japanese Unexamined Patent Application Publication No. 2005-292401, at the same time, a synthetic sound signal output by a D/A converter is directly captured into the A/D converter, the sound recognition by the sound recognizing unit is executed, and a result of the sound recognition and original sound data are compared to determine whether the sound recognition result and the original sound data coincide with each other.

SUMMARY

However, in Japanese Unexamined Patent Application Publication No. 2011-251626 and Japanese Unexamined Patent Application Publication No. 2005-292401, although a fault in a sound input and output route can be diagnosed, there is a problem in that, when there are a plurality of sound input and output routes, it cannot be specified in which route a fault has occurred. Other problems and new characteristics would be made clear from the description of this specification and appended drawings.

According to one embodiment, a semiconductor device includes a memory-transfer control unit that controls data transfer between a memory and a sound unit. A plurality of sound data transfer routes are configured by one memory-transfer control unit and one sound unit. Reproduction sound data is output via at least one sound data transfer route, and at least two pieces of recording sound data generated on account of one piece of the reproduction sound data are acquired via at least two sound data transfer routes.

Note that substituted expressions of a device and a method in the embodiment, a computer program for causing a computer to execute processing of the device or a part of the device, and the like are also effective as modes of the present invention.

According to the embodiment, the semiconductor device can specify a sound data transfer route in which a fault has occurred.

BRIEF DESCRIPTION OF THE DRAWINGS

The above and other aspects, advantages and features will be more apparent from the following description of certain embodiments taken in conjunction with the accompanying drawings, in which:

FIG. 2 is a block diagram of a route switching unit of the semiconductor device according to the first embodiment;

DETAILED DESCRIPTION

Figure 1:
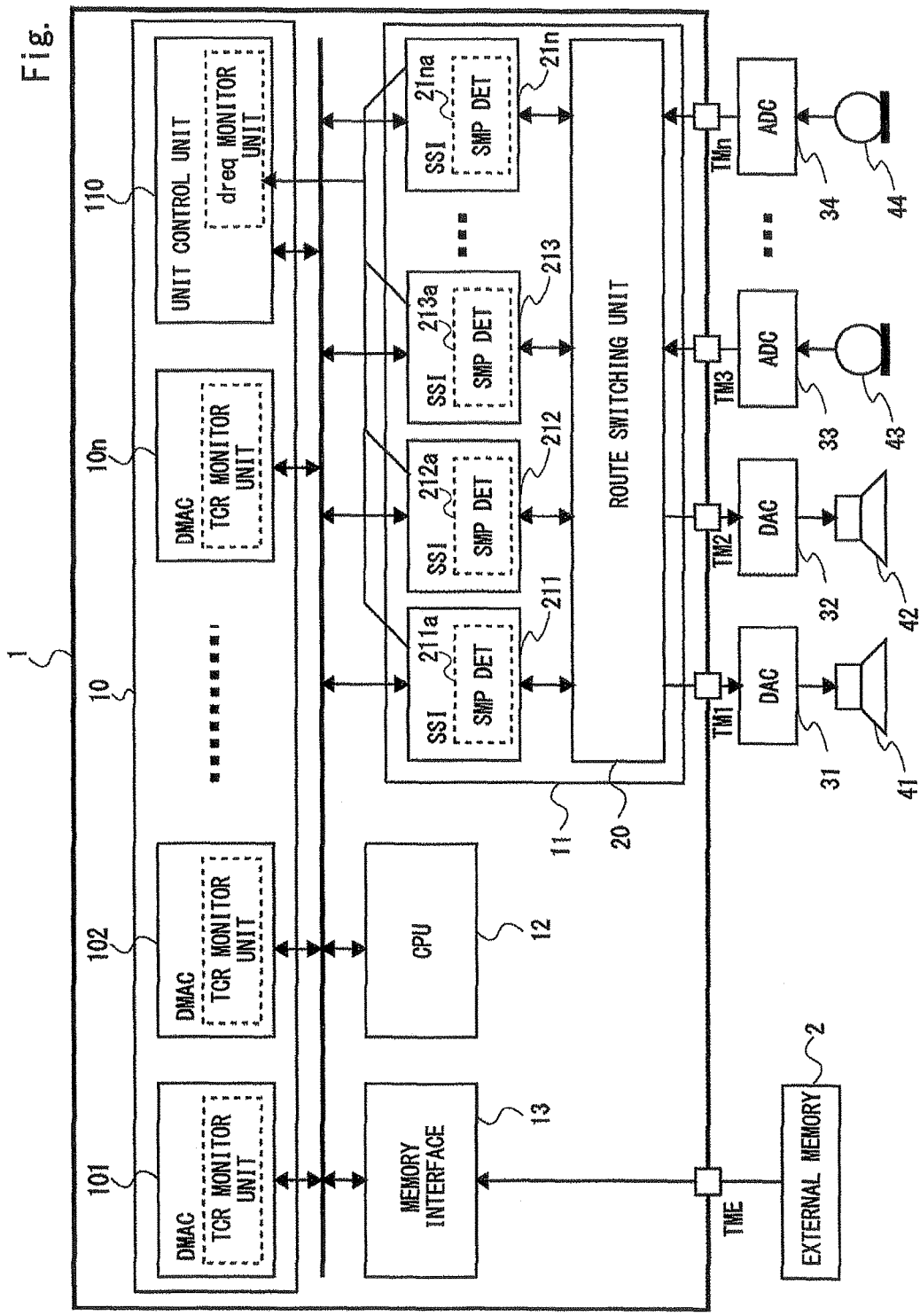
FIG. 1 is a block diagram of a semiconductor device according to a first embodiment.

For clarification of explanation, the following description and the drawings are omitted and simplified as appropriate. Elements described in the drawings as functional blocks for performing various kinds of processing can be configured by a CPU, a memory, and other circuits in terms of hardware and can be realized by a computer program or the like loaded to the memory in terms of software. Therefore, it is understood by those skilled in the art that these functional blocks can be realized in various forms by at least any one of only the hardware, only the software, and a combination of the hardware and the software. The functional blocks are not limited to any one of the hardware and the software. Note that, in the drawings, the same elements are denoted by the same reference numeral and signs. Redundant explanation of the elements is omitted.

The computer program can be stored using various types of non-transitory computer readable media and supplied to a computer. The non-transitory computer readable media include various types of tangible storage media. Examples of the non-transitory computer readable media include magnetic recording media (e.g., a flexible disk, a magnetic tape, and a hard disk drive), magneto-optical recording media (e.g., a magneto-optical disk), a CD-read only memory (CD-ROM), a CD-R, a CD-R/W, semiconductor memories (e.g., a mask ROM, a programmable ROM (PROM), an erasable PROM (EPROM), a flash ROM, and a RAM (Random Access Memory). The computer program may be supplied to the computer by various types of transitory computer readable media. Examples of the transitory computer readable media include an electric signal, an optical signal, and an electromagnetic wave. The transitory computer readable media can supply the computer program to the computer via at least one of a wired communication path such as an electric wire or an optical fiber and a wireless communication path.

First, a block diagram of a semiconductor device 1 according to a first embodiment is shown in FIG. 1. In FIG. 1, as external components of the semiconductor device 1, a memory (e.g., an external memory 2), DA converters 31 and 32, AD converters 33 and 34, speakers 41 and 42, and microphones 43 and 44 are shown. However, the external memory 2, the DA converters 31 and 32, and the AD converters 33 and 34 may be incorporated in the semiconductor device 1.

In an example shown in FIG. 1, the external memory 2 is connected to the semiconductor device 1 via an external terminal TME. The DA converter 31 is connected to the semiconductor device 1 via an external terminal TM1. The DA converter 32 is connected to the semiconductor device 1 via an external terminal TM2. The AD converter 33 is connected to the semiconductor device 1 via an external terminal TM3. The AD converter 34 is connected to the semiconductor device 1 via an external terminal TMn. The DA converters 31 and 32 decode sound data output by the semiconductor device 1, generate an analog sound signal, and output sound from the speakers 41 and 42. The AD converters 33 and 34 convert the analog sound signal collected by the microphones 43 and 44 into a digital signal and output the digital signal to the semiconductor device 1.

As shown in FIG. 1, the semiconductor device 1 according to the first embodiment includes a direct memory access (DMA) controller 10, a sound interface 11, an arithmetic unit (e.g., a CPU 12), and a memory interface 13. The DMA controller 10, the sound interface 11, the CPU 12, and the memory interface 13 are communicably connected to one another by a bus.

The CPU 12 executes a computer program read out from the external memory 2 or the like and performs various kinds of processing according to the read-out computer program. In particular, the semiconductor device 1 according to the first embodiment performs fault detection processing performed using sound data explained below and setting of the DMA controller 10 and the sound interface 11 based on a result of the fault detection processing. The semiconductor device 1 according to the first embodiment performs, on the basis of an instruction from the CPU 12, setting concerning which unit is used in the DMA controller 10 and the sound interface 11 and what kind of a transfer route of sound data is configured.

The DMA controller 10 controls transmission and reception of data between the external memory 2 and the sound interface 11. Note that, in the semiconductor device 1 according to the first embodiment, the external memory 2 is mounted as a component different from the semiconductor device 1. Therefore, the DMA controller 10 performs transmission and reception of data to and from the external memory 2 via the memory interface 13. The memory interface 13 performs at least one of a read instruction and a write instruction to the external memory 2 according to at least one of a read command and a write command from at least one of the DMA controller 10 and the CPU 12.

As shown in FIG. 1, the DMA controller 10 includes memory-transfer control units 101 to 1n (n is an integer indicating the number of units; the same applies below) and a unit control unit 110. The memory-transfer control units 101 to 10n perform, on the basis of an instruction given from the unit control unit 110, transmission and reception of data between the external memory 2 and an instructed sound unit in the sound interface 11. The memory-transfer control units 101 to 10n include TCR monitor units. The TCR monitor units count a TCR count for counting the number of sound data continuously transferred between the external memory 2 and the sound unit. The TCR monitor units generate a second count value (e.g., a TCR frequency measurement value) indicating the length of a transfer interval of the sound data.

The unit control unit 110 controls the memory-transfer control units 101 to 10n. More specifically, the unit control unit 110 sets, in the respective memory-transfer control units, setting values of transfer source addresses, transfer destination addresses, and the number of times of continuous transfer in transfer of sound data by the memory-transfer control units 101 to 10n. The memory-transfer control units 101 to 10n operate on the basis of the setting values. The unit control unit 110 includes a dreq monitor unit. The dreq monitor unit generates a third count value (e.g., a DREQ frequency measurement value) indicating the length of a generation interval of data control signals output by a plurality of sound units in the sound interface 11.

Note that the TCR frequency measurement value and the DREQ frequency measurement value are used in fault detection for the memory-transfer control units 101 to 10n and sound units 211 to 21n explained below.

The sound interface 11 performs input and output of sound data between a sound input and output device provided on the outside of the semiconductor device 1 and the semiconductor device 1. The sound interface 11 includes a route switching unit 20 and the sound units 211 to 21n.

The route switching unit 20 is provided between the sound units 211 to 21n and the external terminals TM1 to TMn. The route switching unit 20 switches a transfer route of sound data input to and output from the sound units 211 to 21n. More specifically, the route switching unit 20 includes first to third route switching functions. In the first route switching function, the route switching unit 20 outputs sound data, which is output from one sound unit, to any one of the external terminals TM1 to TMn. In the second route switching function, the route switching unit 20 loops back sound data from one sound unit to the other sound units. In the third route switching function, the route switching unit 20 outputs sound data, which is input from one external terminal, to any one of the sound units 211 to 21n. Details of the route switching unit 20 are explained below.

The sound units 211 to 21n perform output of sound data stored in the external memory 2 to the external terminals and transfer of sound data input from the external terminals to the memory. The sound units 211 to 21n generates a first count value (e.g., a WS frequency measurement value) indicating the length of a cycle of a sampling frequency of sound data.

More specifically, when receiving sound data to be reproduced (hereinafter referred to as reproduction sound data), the sound units 211 to 21n generate WS signals on the basis of sampling frequency information included in the received reproduction sound data. The WS signals indicate reproduction channels. The sound units 211 to 21n convert information concerning sound components in the received reproduction sound data from parallel signals into serial signals. The sound units 211 to 21n simultaneously output the WS signals and the serial signals.

When receiving sound data that should be recorded (hereinafter referred to as recording sound data), the sound units 211 to 21n convert the received sound data from serial signals into parallel signals. The sound units 211 to 21n add sampling frequency information to the parallel signals on the basis of WS signals received together with the recording sound data and output the parallel signals.

The sound units 211 to 21n include sampling-frequency detecting units 211a to 21na. The sampling-frequency detecting units 211a to 21na generate a first count value (e.g., a WS frequency measurement value) indicating the length of a cycle of a sampling frequency of sound data. The WS frequency measurement value is transmitted to the unit control unit 110. The CPU 12 acquires SW frequency measurement values generated by the sound units 211 to 21n referring to the WS frequency measurement value stored in the unit control unit 110.

Figure 2:
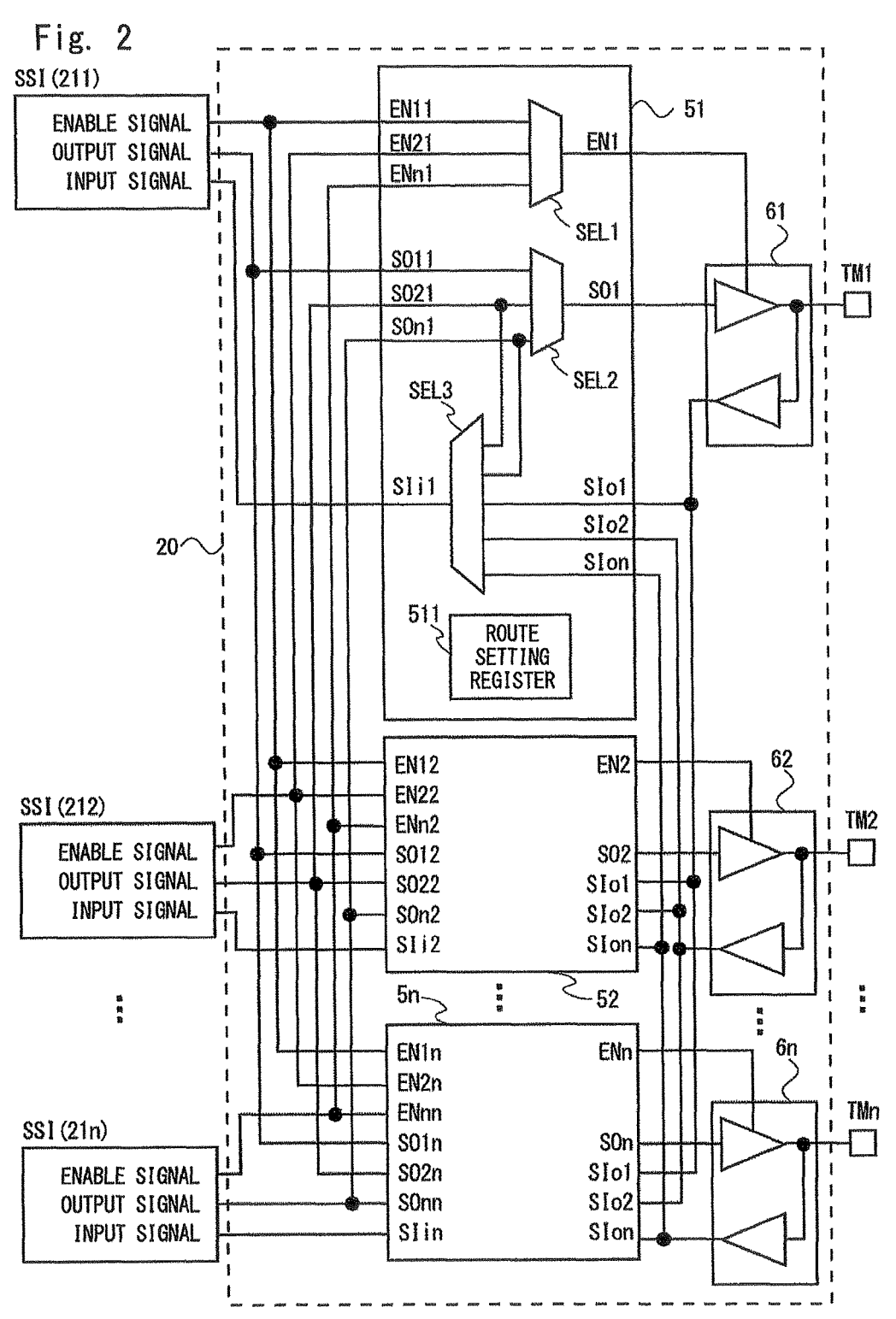

Subsequently, details of the route switching unit 20 are explained. In FIG. 2, a block diagram of the route switching unit 20 according to the first embodiment is shown. As shown in FIG. 2, the route switching unit 20 includes selector units 51 to 5n and input-output buffers 61 to 6n. In FIG. 2, signals input to and output from the sound units 211 and 21n are shown. As shown in FIG. 2, the sound units 211 to 21n output ENABLE signals and OUTPUT signals. INPUT signals are input to the sound units 211 to 21n. The ENABLE signals are signals for switching whether the input-output buffers 61 to 6n are caused to function as at least one of input buffers and output buffers. The OUTPUT signals are sound data transferred from the sound unit side to an output terminal side. The INPUT signals are sound data transferred from the output terminal side to the sound unit side. Note that the OUTPUT signals and the INPUT signals include WS signals and serial signals (sound data).

The selector units 51 to 5n include the same configuration except that only combinations of signals input to and output from the selector units 51 to 5n are different. Therefore, the selector unit 51 is explained here. The selector unit 51 includes selectors SEL1, SEL2, and SEL3 and a route setting register 511. The route setting register 511 stores a route setting value indicating an output destination of sound data. For example, the route setting value is stored in the route setting register 511 or rewritten by the CPU 12. The selectors SEL1, SEL2, and SEL3 switch a transfer route of the sound data on the basis of a value of the route setting value. The respective selectors perform route switching explained below.

The selector SEL1 selects any one of the ENABLE signals (EN11 to ENn1 shown in FIG. 2) output by the sound units 211 to 21n and outputs the ENABLE signal to the input-output buffer 61. The selector SEL2 selects any one of the OUTPUT signals (SO11 to SOn1 shown in FIG. 2) output by the sound units 211 to 21n and outputs the OUTPUT signal to the input-output buffer 61. The selector SEL3 selects any one of the OUTPUT signals (SO21 to SOn1 shown in FIG. 2) other than the OUTPUT signal of the sound unit, which is an output destination of selected signals, and any one of the INPUT signals (SIo1 to SIon shown in FIG. 2) output by the input-output buffers 61 to 6n. The selector SEL3 outputs the selected signals to the sound unit (in the case of FIG. 2, the sound unit 211), which is the output destination corresponding to the signals. Note that the selectors SEL1, SEL2, and SEL3 output, on the basis of the route setting value stored in the route setting register 511, signals to be selected by the selectors SEL1, SEL2, and SEL3.

The input-output buffers 61 to 6n include input buffers and output buffers. The input buffers transmit signals input from the external terminals to the semiconductor device 1. The output buffers switch, according to logical levels of the ENABLE signals, the semiconductor device 1 to a state in which the OUTPUT signals are output and a state in which output terminals are set to high impedance.

Subsequently, the operation of the semiconductor device 1 according to the first embodiment is explained. The semiconductor device 1 according to the first embodiment has two operation modes of fault inspection processing for self-detecting a fault in the semiconductor device 1 and normal operation processing for output of reproduction sound data stored in the external memory 2 and recording of sound input from the outside in the external memory 2 as recording sound data. In the fault inspection, the semiconductor device 1 according to the first embodiment specifies a fault module in a sound data transfer route (hereinafter sometimes referred to as lane) in which a fault has occurred and performs self-recovery processing for replacing the fault module with a normal module. In the normal operation mode, the semiconductor device 1 according to the first embodiment can optionally set, with the CPU 12, which lane is used for reproduction of the reproduction sound data and recording of the sound.

In the fault inspection, the semiconductor device 1 according to the first embodiment performs inspection using operation of the normal operation mode. More specifically, reproduction processing of reproduction sound data in the fault inspection and acquisition processing of recording sound data obtained by recording sound acquired by a microphone provided on the outside are substantially the same as reproduction processing and recording processing in the normal operation mode. Therefore, in the following explanation, the fault inspection of the semiconductor device 1 according to the first embodiment is explained in detail.

In the fault inspection, the semiconductor device 1 according to the first embodiment performs lane setting for inspection, reproduces reproduction sound data according to the lane setting for inspection, generates recording sound data on the basis of the reproduction sound data, and detects a faulty lane on the basis of the reproduction sound data and the recording sound data. The semiconductor device 1 according to the first embodiment performs self-recovery processing for specifying a faulty module in the faulty lane and replacing the faulty module with another module.

Figure 3:
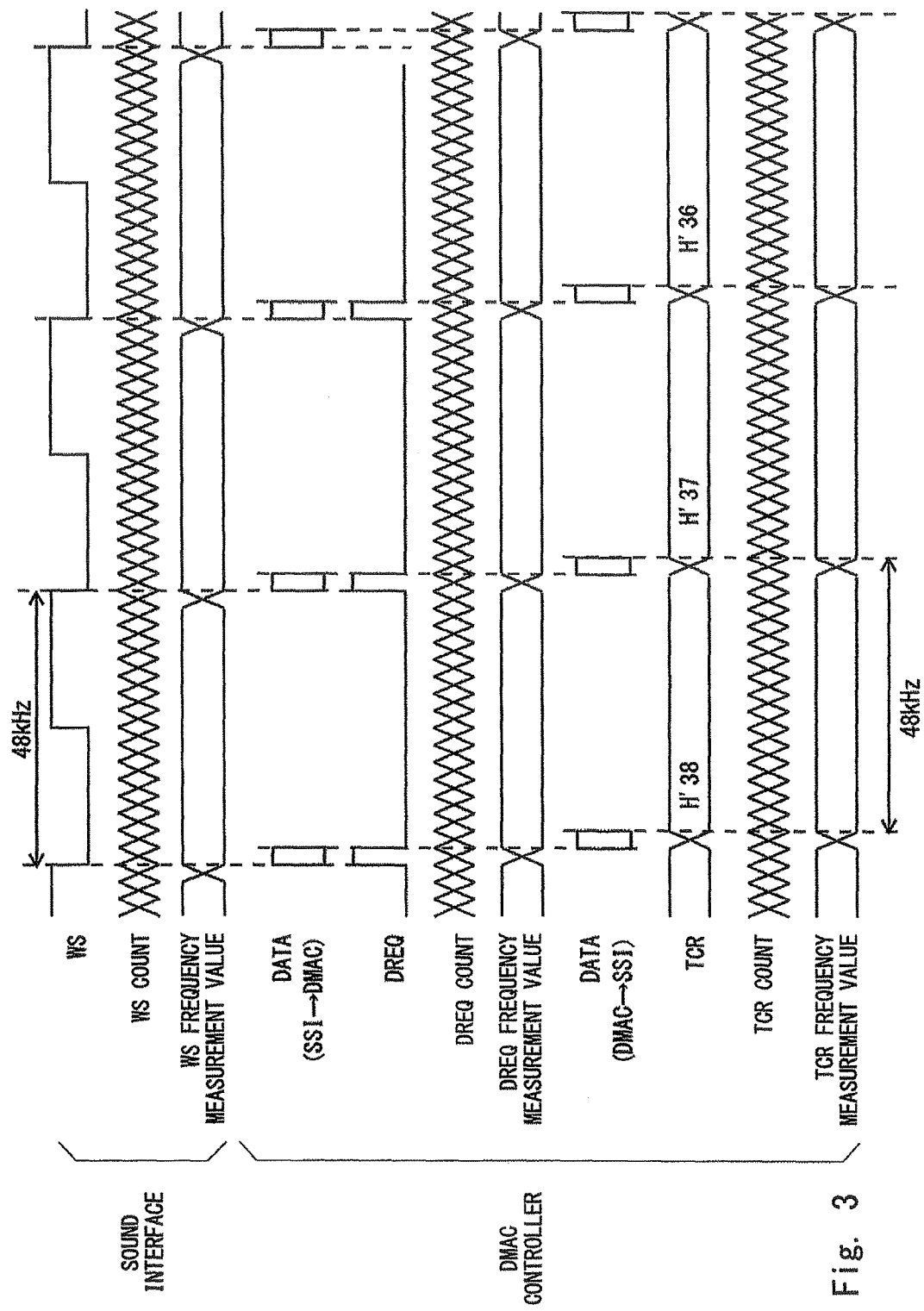
FIG. 3 is a timing chart showing the operation of the semiconductor device according to the first embodiment.

In the self-recovery processing, in the specifying of the faulty module, values generated in the memory-transfer control units 101 to 10n, the unit control unit 110, and the sound units 211 to 21n are used. Before the explanation of the fault inspection, the values generated in the memory-transfer control units 101 to 10n, the unit control unit 110, and the sound units 211 to 21n are explained. In FIG. 3, a timing chart showing the operation of the semiconductor device 1 according to the first embodiment is shown.

As shown in FIG. 3, the semiconductor device 1 according to the first embodiment performs transmission and reception of data related to the reproduction processing and the recording processing at a cycle corresponding to a sampling frequency of sound data. In FIG. 3, a WS signal is shown as a signal generated according to a sampling frequency. The WS signal is a signal generated in the sound units 211 to 21n.

When performing the recording processing, the semiconductor device 1 according to the first embodiment outputs, according to a cycle of the WS signal, sound data obtained from the microphone 43 or the like provided on the outside. On the other hand, when the semiconductor device 1 according to the first embodiment performs the reproduction processing, the sound units 211 to 21n output a DREQ signal according to the cycle of the WS signal. The DREQ signal is one of control signals output by the sound units 211 to 21n. The unit control unit 110 of the DMA controller 10 instructs, according to the DREQ signal, the memory-transfer control units 101 to 10n to transfer the sound data to the sound units 211 to 21n. At this point, the memory-transfer control units 101 to 10n transfer the sound data at the cycle corresponding to the sampling frequency.

In the semiconductor device 1 according to the first embodiment, the sampling-frequency detecting units 211a to 21na in the sound units 211 to 21n count, during one cycle of the WS signal, a signal having a frequency higher than the sampling frequency to generate a WS frequency measurement value indicating the length of one cycle of the WS signal. The unit control unit 110 in the DMA controller 10 counts, during one cycle of the DREQ signal, the signal having the frequency higher than the sampling frequency to generate a DREQ frequency measurement value indicating the length of one cycle of the DREQ signal. The memory-transfer control units 101 to 10n in the DMA controller 10 count the signal having the frequency higher than the sampling frequency to generate a TCR frequency measurement value indicating the length of timing in which a TCR count value indicating the number of times of data transfer is continuously updated.

Figure 4:
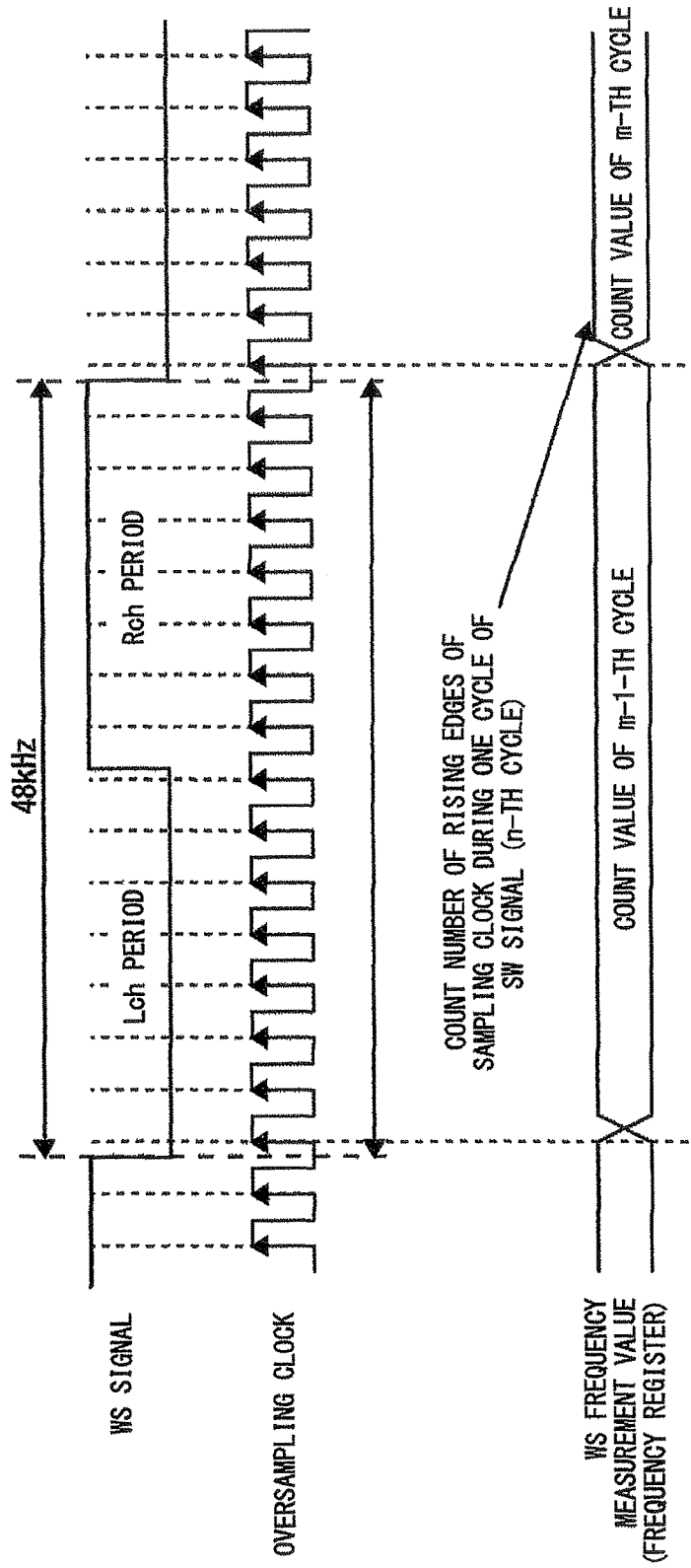
FIG. 4 is a timing chart showing update timing for a WS frequency measurement value in the semiconductor device according to the first embodiment.

Methods of generating the WS frequency measurement value, the DREQ frequency measurement value, and the TCR frequency measurement value are explained. Note that the methods of generating the WS frequency measurement value, the DREQ frequency measurement value, and the TCR frequency measurement value are substantially the same. Therefore, in the following explanation, the method of generating the WS frequency measurement value is explained below. In FIG. 4, a timing chart showing update timing of the WS frequency measurement value in the semiconductor device 1 according to the first embodiment is shown.

As shown in FIG. 4, the semiconductor device 1 according to the first embodiment uses an oversampling clock having a frequency higher than the frequency of the WS signal in order to generate the WS frequency measurement value. The semiconductor device 1 counts the number of rising edges of the oversampling clock during one cycle of the WS signal to generate the WS frequency measurement value. The WS frequency measurement value at an m-th cycle is stored in frequency registers in the sound units 211 to 21n at an m+1-th cycle.

Figure 5:
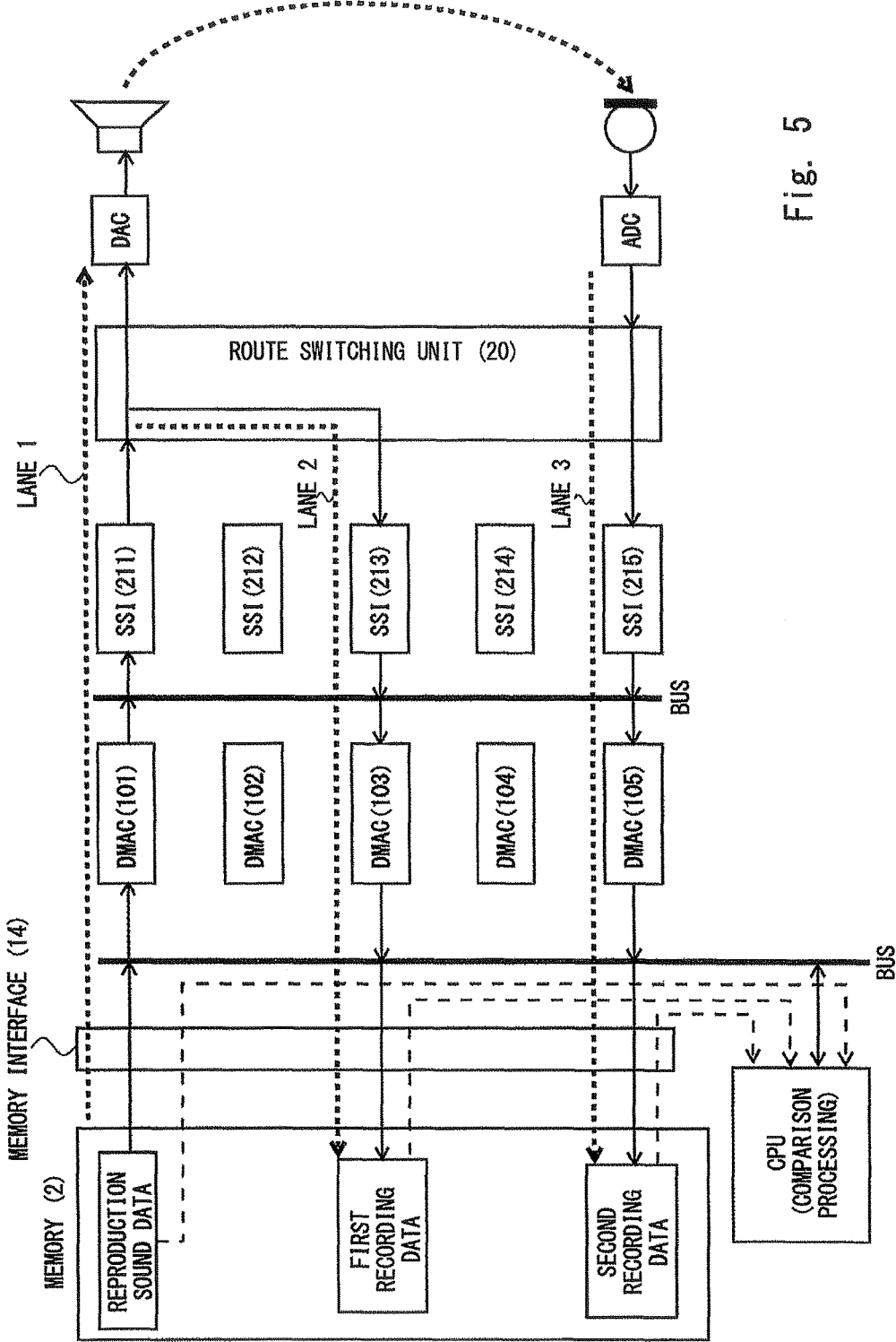
FIG. 5 is a block diagram for explaining a route during a fault inspection for a sound data transfer route in the semiconductor device according to the first embodiment.

Subsequently, the operation during the fault inspection of the semiconductor device 1 according to the first embodiment is explained in detail. In the semiconductor device 1 according to the first embodiment, during the fault inspection, the CPU 12 controls the route switching unit 20 according to a computer program. According to the control, the semiconductor device 1 configures at least three sound data transfer routes configured by one sound unit and one memory-transfer control unit. More specifically, the semiconductor device 1 configures at least two sound data transfer routes as an output route of reproduction sound data and configures at least two sound data transfer routes as a route for acquiring recording sound data. The semiconductor device 1 according to the first embodiment transfers the reproduction sound data stored in the memory from the external memory 2 to the external terminal side via at least one sound data transfer route. The semiconductor device 1 according to the first embodiment transfers recording sound data generated because of the transferred reproduction sound data from the external terminal side to the external memory 2 via at least two sound data transfer routes. Therefore, an example of setting of the sound data transfer routes during the fault inspection of the semiconductor device 1 according to the first embodiment is shown in FIG. 5. Note that, in the example shown in FIG. 5, an example in which n is 5 is explained.

In the example shown in FIG. 5, reproduction sound data is transferred from the external memory 2 to the external terminal side by a sound data transfer route (hereinafter referred to as first lane) configured by the memory-transfer control unit 101 and the sound unit 211. The reproduction sound data transferred via the first lane is reproduced by a DA converter and a speaker connected ahead of the first lane.

In the example shown in FIG. 5, recording sound data is transferred from the external terminal side to the external memory 2 by a sound data transfer route (hereinafter referred to as second lane) configured by the sound unit 213 and the memory-transfer control unit 103. The second lane is a route for recording, in the external memory 2, recording sound data generated by looping back the reproduction sound data transferred via the first lane in the route switching unit 20. The recording sound data recorded via the second lane is referred to as second recording data in the first embodiment.

In the example shown in FIG. 5, the recording sound data is transferred from the external terminal side to the external memory 2 by a sound data transfer route (hereinafter referred to as third lane) configured by the sound unit 215 and the memory-transfer control unit 105. The third lane is a route for recording, in the external memory 2, recording sound data generated by recording, with a microphone, sound output from the speaker provided ahead of the first lane. The recording sound data recorded via the third lane is referred to as third recording data in the first embodiment.

With the configuration explained above, the semiconductor device 1 according to the first embodiment accumulates, in the memory, at least two recording sound data transferred using at least two sound data transfer routes. The semiconductor device 1 according to the first embodiment compares, in the CPU 12, the reproduction sound data and the at least two recording sound data and detects a fault in the sound data transfer routes.

Subsequently, a fault detection method in the semiconductor device 1 according to the first embodiment is explained with reference to a flowchart. Therefore, a flowchart of a fault inspection method for a sound data transfer route in the semiconductor device 1 according to the first embodiment is shown in FIG. 6.

Figure 6:
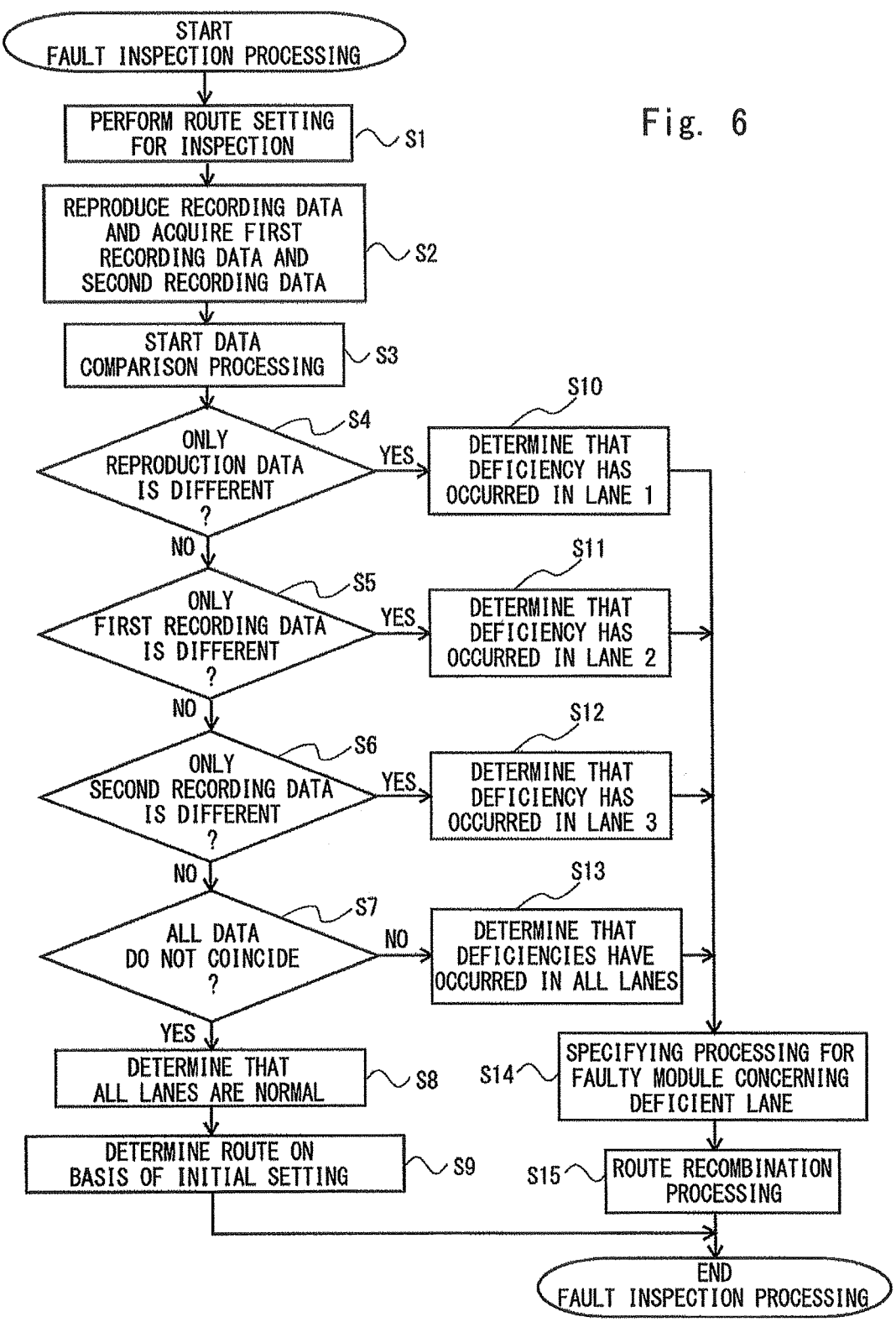
FIG. 6 is a flowchart of a fault inspection method for the sound data transfer route in the semiconductor device according to the first embodiment.

As shown in FIG. 6, the semiconductor device 1 according to the first embodiment performs route setting for inspection according to a start of a fault inspection (step S1). More specifically, in step S1, the CPU 12 switches a route of the route switching unit 20 and configures, for example, the first lane to the third lane shown in FIG. 5 according to a computer program.

Subsequently, the semiconductor device 1 according to the first embodiment reproduces reproduction sound data via the first lane and acquires first recording sound data and second recording sound data via the second lane and the third lane (step S2). The semiconductor device 1 according to the first embodiment starts comparison processing of the sound data acquired in step S2 (step S3).

In the data comparison processing started in step S3, the semiconductor device 1 according to the first embodiment performs comparison determination processing in steps S4 to S7. In step S4, the semiconductor device 1 according to the first embodiment determines whether only the reproduction sound data is different among the three sound data. When determining in step S4 that only the reproduction sound data is different, the semiconductor device 1 determines that a deficiency has occurred in the first lane (step S10). On the other hand, when determining in step S4 that different sound data is not only the reproduction sound data, the semiconductor device 1 according to the first embodiment performs the comparison determination processing in step S5.

In step S5, the semiconductor device 1 according to the first embodiment determines whether only the first recording sound data is different among the three sound data. When determining in step S5 that only the first recording sound data is different, the semiconductor device 1 according to the first embodiment determines that a deficiency has occurred in the second lane (step S11). On the other hand, when determining in step S5 that different sound data is not only the first recording sound data, the semiconductor device 1 according to the first embodiment performs the comparison determination processing in step S6.

In step S6, the semiconductor device 1 according to the first embodiment determines whether only the second recording sound data is different among the three sound data. When determining in step S6 that only the second recording sound data is different, the semiconductor device 1 according to the first embodiment determines that a deficiency has occurred in the third lane (step S12). On the other hand, when determining in step S6 that the different sound data is not only the second recording sound data, the semiconductor device 1 according to the first embodiment performs the comparison determination processing in step S7.

In step S7, the semiconductor device 1 according to the first embodiment determines whether all the three sound data are different. When determining in step S7 that all the sound data are different, the semiconductor device 1 according to the first embodiment determines that deficiencies have occurred in all the lanes (step S13). On the other hand, when determining in step S7 that all the data coincide with one another, the semiconductor device 1 according to the first embodiment determines that all the lanes are normal (step S8), sets a route on the basis of a route setting value for normal operation such as initial setting (step S9), and ends the fault detection.

When determining in steps S10 to S13 that a fault has occurred in any one of the three lanes set for inspection, the semiconductor device 1 according to the first embodiment performs specifying processing (step S14) for a faulty module concerning the lane having a deficiency and a route recombination processing (step S15). Details of the specifying processing for the faulty module and the route recombination processing are explained below.

Figure 7:
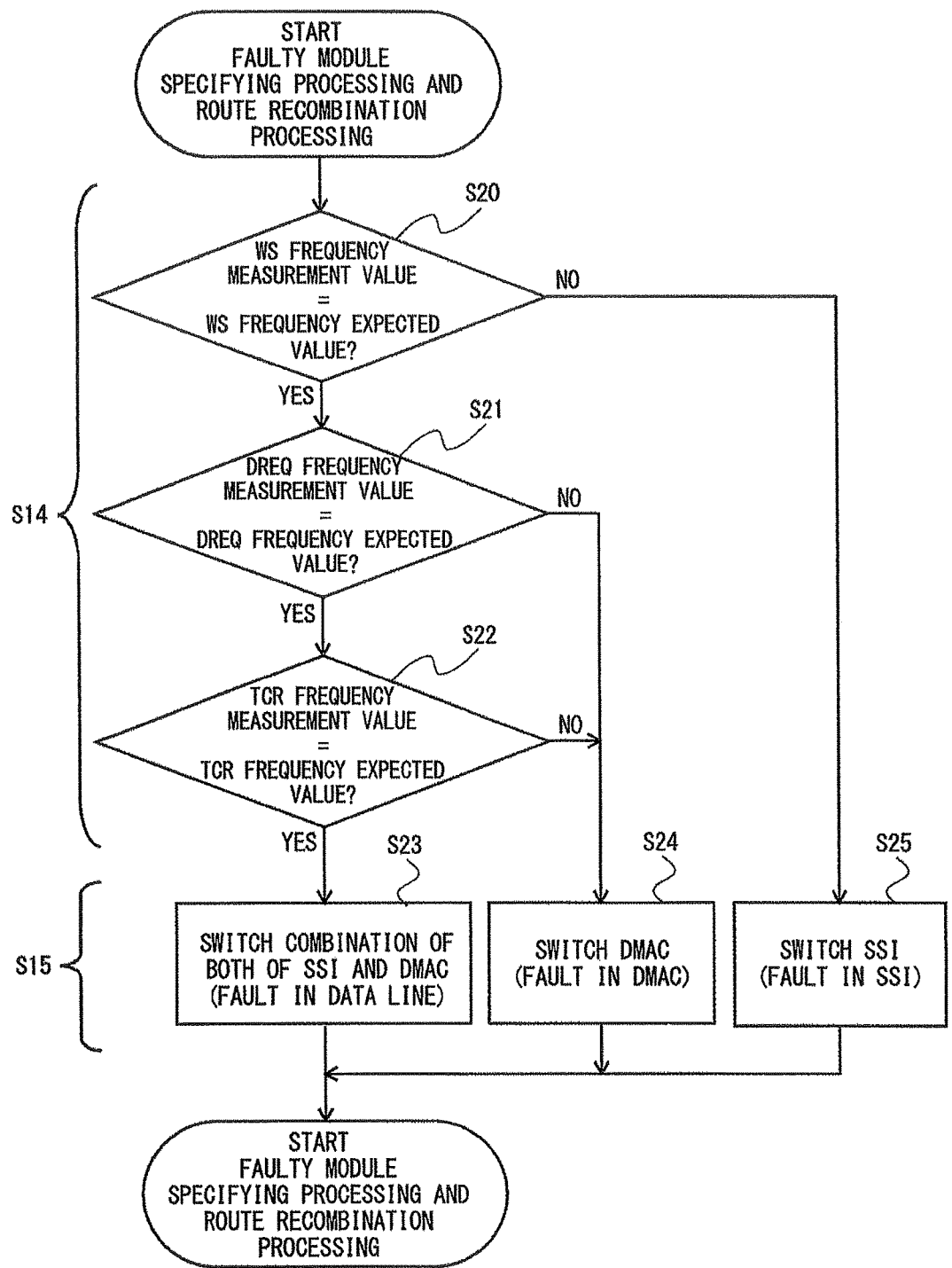
FIG. 7 is a flowchart of fault module specifying processing and route recombination processing for the sound data transfer route in the semiconductor device according to the first embodiment.

In FIG. 7, a flowchart of the faulty module specifying processing and the route recombination processing for sound data transfer route in the semiconductor device 1 according to the first embodiment is shown. As shown in FIG. 7, the semiconductor device 1 according to the first embodiment performs processing in steps S20 to S22 as the faulty module specifying processing in step S14 and performs processing in steps S23 to S25 as the route recombination processing in step S15. Note that the processing in steps S20 to S25 is performed by the CPU 12.

In step S20, the semiconductor device 1 according to the first embodiment determines whether a WS frequency measurement value coincides with an expected value (e.g., a WS frequency expected value) set in advance. When the WS frequency measurement value does not coincide with the WS frequency expected value in step S20, a sound unit included in a faulty lane is considered to be not normally operating. Therefore, when the WS frequency measurement value does not coincide with the WS frequency expected value, the semiconductor device 1 according to the first embodiment determines that the sound unit included in the faulty lane has a fault and replaces the sound unit included in the faulty lane with anther sound unit (step S25). On the other hand, when determining in step S20 that the WS frequency measurement value coincides with the WS frequency expected value, the semiconductor device 1 according to the first embodiment performs processing in step S21.

In step S21, the semiconductor device 1 according to the first embodiment determines whether a DREQ frequency measurement value coincides with an expected value (e.g., a DREQ frequency expected value) set in advance. When the DREQ frequency measurement value does not coincide with the DREQ frequency expected value in step S21, a memory-transfer control unit included in the faulty lane is considered to be not normally operating. Therefore, when the DREQ frequency measurement value does not coincide with the DREQ frequency expected value, the semiconductor device 1 according to the first embodiment determines that a memory-transfer control unit included in the faulty lane has a fault and replaces the memory-transfer control unit included in the faulty lane with another memory-transfer control unit (step S24). On the other hand, when determining in step S21 that the DREQ frequency measurement value coincides with the DREQ frequency expected value, the semiconductor device 1 according to the first embodiment performs processing in step S22.

In step S22, the semiconductor device 1 according to the first embodiment determines whether a TCR frequency measurement value coincides with an expected value (e.g., a TCR frequency expected value) set in advance. When the TCR frequency measurement value does not coincide with the TCR frequency expected value in step S21, the memory-transfer control unit included in the faulty lane is considered to be not normally operating. Therefore, when the TCR frequency measurement value does not coincide with the TCR frequency expected value, the semiconductor device 1 according to the first embodiment determines that the memory-transfer control unit included in the faulty lane has a fault and replaces the memory-transfer control unit included in the faulty lane with another memory-transfer control unit (step S24). On the other hand, when determining in step S22 that the TCR frequency measurement value coincides with the TCR frequency expected value, the semiconductor device 1 according to the first embodiment can determine that both of the sound unit and the memory-transfer control unit included in the faulty lane has a fault. This is because, when both of the sound unit and the memory-transfer control unit have faults, both of the measurement values are zero. In this case, the semiconductor device 1 according to the first embodiment switches both of the sound unit and the memory-transfer control unit included in the faulty lane to other units (step S23).

The semiconductor device 1 ends the faulty module specifying processing and the route recombination processing according to completion of steps S23 to S25. Note that it is preferable that, in the processing in steps S23 to S25, the route switching is performed according to a change of the route setting value of the route switching unit 20 by the CPU 12 and the comparison processing in steps S20 to S22 is performed taking into account fluctuation in a plurality of measurement values obtained during an inspection period of a fixed length. This is because, when the determination of coincidence with an expected value is performed on the basis of one measurement value, wrong determination is likely to be caused by the influence of fluctuation or the like of the value.

Figure 8:
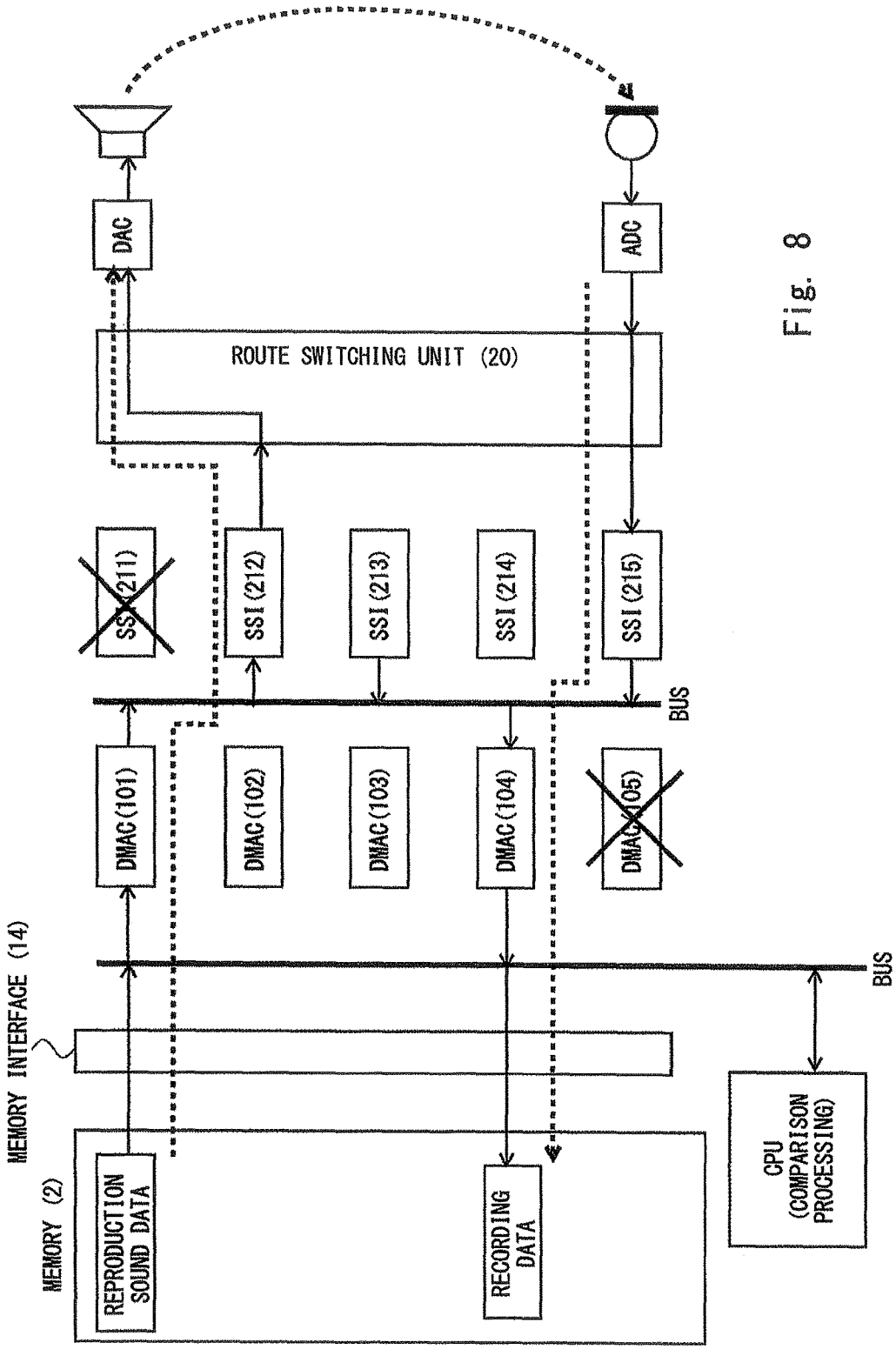
FIG. 8 is a block diagram showing an example of a recombination mode of the sound data transfer route in the semiconductor device according to the first embodiment.

Therefore, the switching processing for the unit in steps S24 and S25 is explained with reference to the figures. In FIG. 8, a block diagram showing an example of a recombination mode of a sound data transfer route in the semiconductor device according to the first embodiment is shown.

FIG. 8 is an example in which the sound unit 211 in the first lane and the memory-transfer control unit 105 in the third lane have faults. In this case, the semiconductor device 1 according to the first embodiment can replace the sound unit 211 with the sound unit 212 and replace the memory-transfer control unit 105 with the memory-transfer control unit 104.

From the above explanation, since the semiconductor device 1 according to the first embodiment includes the route switching unit 20, the semiconductor device 1 can configure at least one sound data transfer route for transferring reproduction sound data and further configure at least two sound data transfer routes for transferring at least two recording sound data generated because of the reproduction sound data. Consequently, the semiconductor device 1 according to the first embodiment can specify which of a plurality of sound data transfer routes has a fault. When a fault is checked for each of the plurality of sound data transfer routes, to specify a sound data transfer route which has a fault, reproduction and recording processing needs to be performed a plurality of times. However, the semiconductor device 1 according to the first embodiment can determine presence or absence of a fault of the plurality of sound data transfer routes simply by reproducing the reproduction sound data once.

The semiconductor device 1 according to the first embodiment generates, in the fault detection processing, measurement values (e.g., a WS frequency measurement value, a DREQ frequency measurement value, and a TCR frequency measurement value) for monitoring a transfer state of sound data and determines presence or absence of a fault in the units on the basis of the measurement values. The semiconductor device 1 according to the first embodiment can specify in which units in the sound data transfer route a fault has occurred.

Since a unit which has a fault can be specified, the semiconductor device 1 according to the first embodiment can replace the faulty unit with another normal unit and perform normal operation. Consequently, the semiconductor device 1 according to the first embodiment can improve reliability of the device. In particular, in a use requiring reliability such as an automobile, it is important to continue operation when there is a fault in a part of a semiconductor device. Therefore, effects of a function that can not only detect presence or absence of a fault but also replace a faulty unit with another unit and continue operation are large.

Second Embodiment

In a second embodiment, another form is explained concerning a setting method for a sound data transfer route during a fault inspection is explained. Note that, in the second embodiment, components same as the components explained in the first embodiment are denoted by reference numerals and signs same as the reference numerals and signs in the first embodiment and explanation of the components is omitted.

Figure 9:
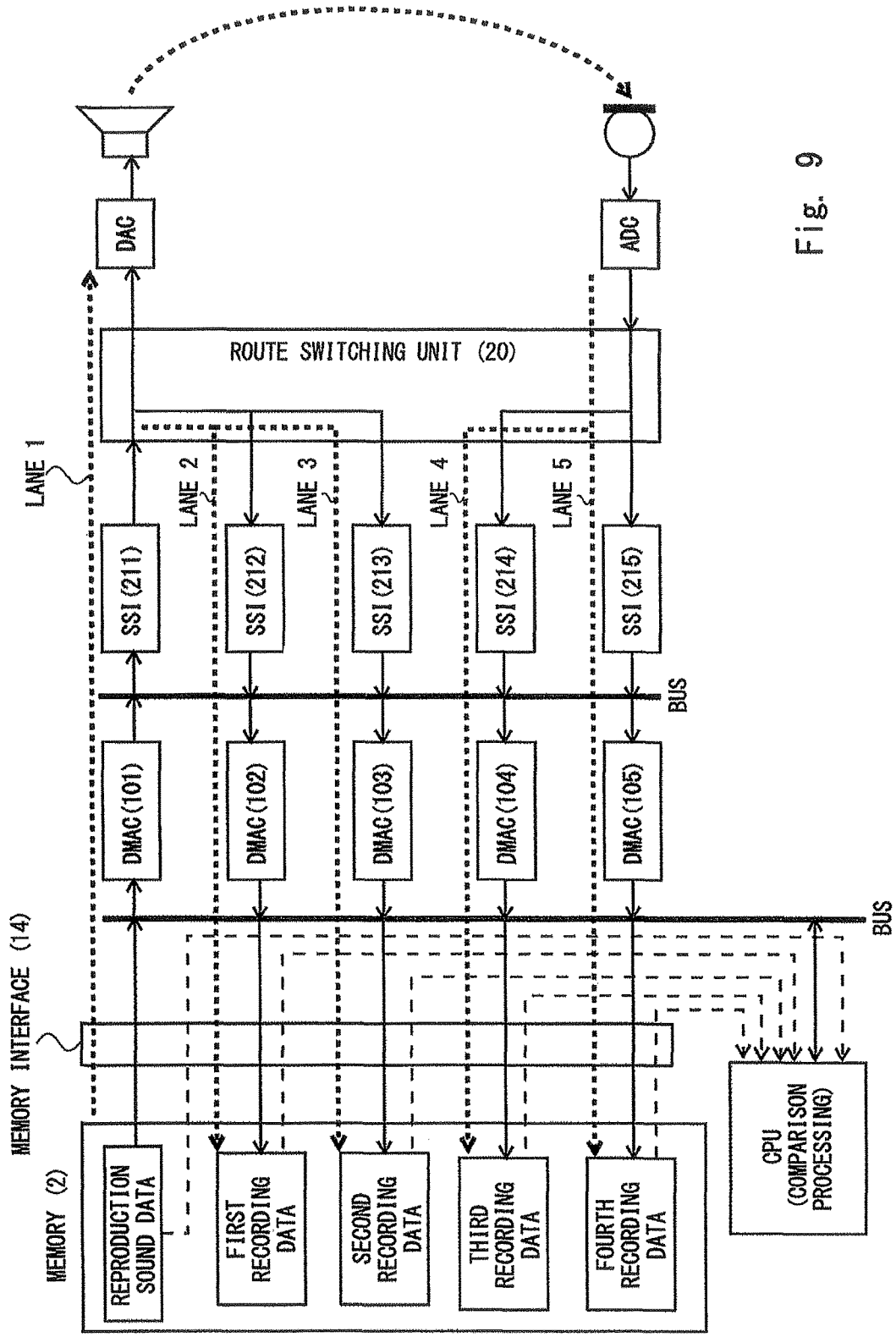
FIG. 9 is a block diagram for explaining a route during a fault inspection for a sound data transfer route in a semiconductor device according to a second embodiment.

In FIG. 9, a block diagram for explaining a route during a fault inspection for a sound data transfer route in the semiconductor device 1 according to the second embodiment is shown. As shown in FIG. 9, in the second embodiment, the number of sound data transfer route during the fault inspection is set to be a maximum number including the number of different sound units and the number of different memory-transfer control units. More specifically, in the second embodiment, one sound data transfer route (first lane) for transferring reproduction sound data is set. In the second embodiment, two sound data transfer routes (a second lane and a third lane) for looping back sound data transferred via the first lane in the route switching unit 20 are set. Two sound data transfer routes (a fourth lane and a fifth lane) for recording, via a microphone, sound output from a speaker via the first lane are set.

That is, in the second embodiment, a sound data transfer route during a fault inspection is configured using all memory-transfer control units and sound units configuring a sound data transfer route in the semiconductor device. Consequently, the semiconductor device 1 can inspect all the units configuring the sound data transfer route by performing inspection once. Therefore, the semiconductor device 1 according to the second embodiment can improve, while reducing an inspection time, reliability of a unit that replaces a faulty unit.

Third Embodiment

In third embodiment, another form is explained concerning a setting method for a sound data transfer route during a fault inspection is explained. Note that, in the third embodiment, components same as the components explained in the first embodiment are denoted by reference numerals and signs same as the reference numerals and signs in the first embodiment and explanation of the components is omitted.

Figure 10:
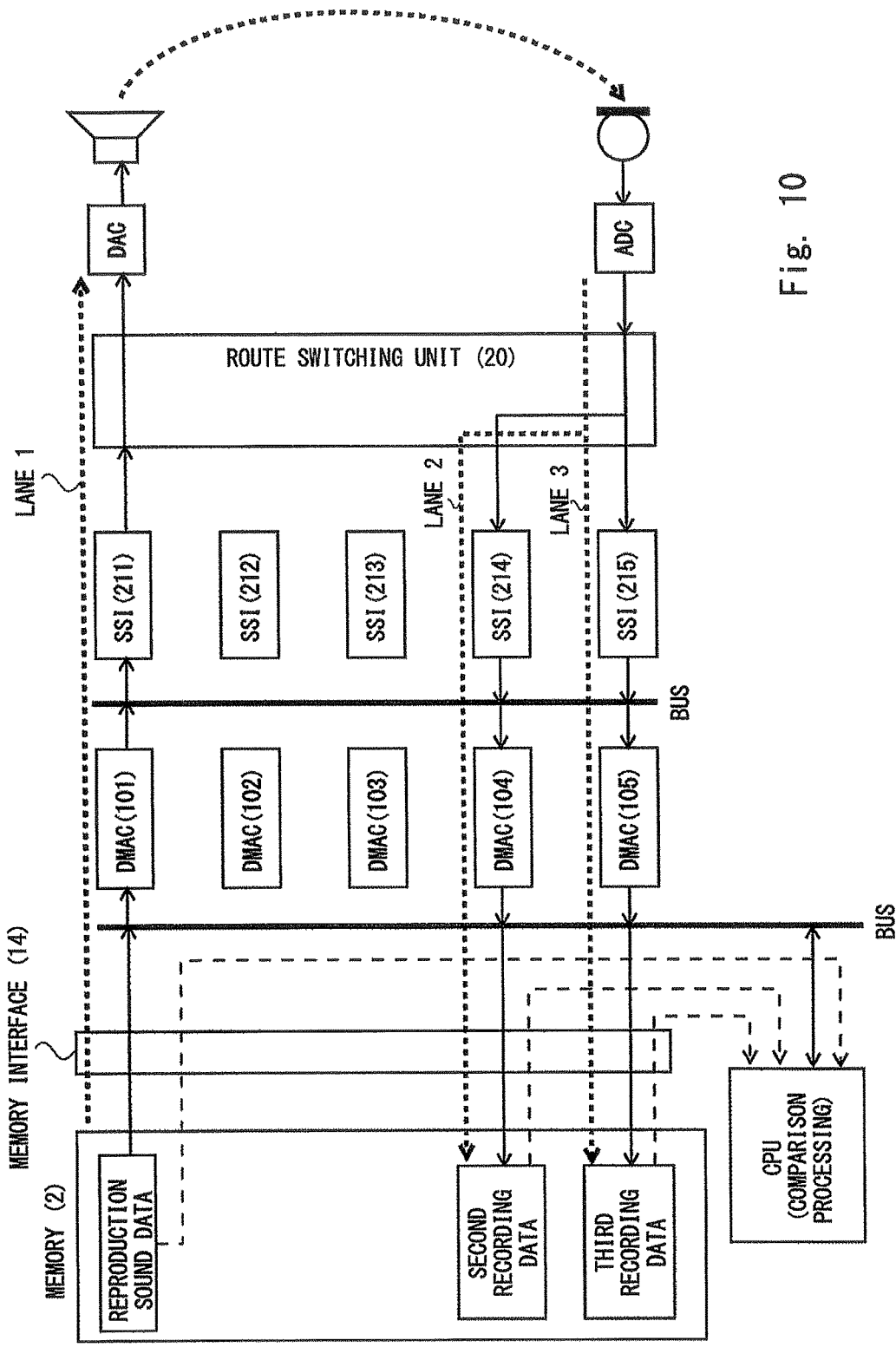
FIG. 10 is a block diagram for explaining a route during a fault inspection for a sound data transfer route in a semiconductor device according to a third embodiment.

In FIG. 10, a block diagram for explaining a route during a fault inspection for a sound data transfer route in the semiconductor device 1 according to the third embodiment is shown. In the third embodiment, a route is set to include two or more at least one of first sound data transfer routes for transferring recording sound data obtained by recording, with a microphone, sound output from a speaker via an external terminal and second sound data transfer routes for transferring recording sound data generated by looping back reproduction sound data in the route switching unit 20. An example shown in FIG. 10 is an example in which two first data transfer routes are set. More specifically, in the third embodiment, one sound data transfer route (a first lane) for transferring reproduction sound data is set. In the third embodiment, two sound data transfer routes (a second lane and a third lane) for recording, via a microphone, sound output from a speaker via the first lane are set.

That is, in the third embodiment, sound output from one speaker is collected by one microphone. Recording sound data generated on the basis of an input to the microphone is transferred to the external memory 2 via two sound data transfer routes. Two recording sound data are generated for an input from the one microphone. Consequently, the semiconductor device 1 can determine whether there is a fault in any one of a DA converter and a microphone on the outside if, for example, the two recording sound data indicate silence and coincide with each other. When there is a fault, the semiconductor device 1 can change a combination of a DA converter and a speaker in use. Therefore, it is possible to improve reliability of a sound system in which the semiconductor device 1 is used.

The invention devised by the inventor is specifically explained above on the basis of the embodiment. However, the present invention is not limited by the embodiments. It goes without saying that various changes are possible without departing from the spirit of the invention.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device, comprising:
a processor coupled to a storage device storing instructions for executing:
an arithmetic unit that performs processing for executing a computer program;
a plurality of sound units that convert sound data stored in a memory into a serial signal, add sampling frequency information of the sound data to the serial signal and output the serial signal to a plurality of external terminals, and convert the sound data input from one of the plurality of the external terminals into a parallel signal, add the sampling frequency information of the sound data to the parallel signal, and transfer the parallel signal to the memory;
a route switching unit that switches a transfer route of sound data input to and output from the plurality of sound units, the route switching unit being provided between the plurality of sound units and the plurality of external terminals; and
a memory transfer controller that includes a plurality of memory-transfer control units that control transmission and reception of data between the memory and the plurality of sound units, and a unit control unit that controls the plurality of memory-transfer control units,
wherein the arithmetic unit controls the route switching unit according to the computer program to configure first to third sound data transfer routes configured by one of the sound units and one of the memory-transfer control units, transfers reproduction sound data stored in the memory from the memory to a side of the external terminals via the first sound data transfer route, and transfers two recording sound data generated on account of the reproduction sound data from. the side of the external terminals to the memory via the second and third sound data transfer routes,
wherein the arithmetic unit accumulates, in the memory, two pieces of the recording sound data transferred using the second and third sound. data transfer routes and compares the reproduction sound data and the two pieces of recording sound data and detects a fault in the sound data transfer routes,
wherein the plurality of sound units generate a first count value indicating a length of a cycle of a sampling frequency of the sound data,
wherein the plurality of memory-transfer control units generate a second count mile indicating a length of a transfer interval of the sound data,
wherein the unit control unit generates a third count value indicating a length of a generation interval of a data control signal output by the sound units,
wherein, when the first count value and a first expected value indicating an expected value of the first count value set in advance do not coincide with each other, the arithmetic unit determines that the sound unit has a fault,
wherein, when the second count value and a second expected value indicating an expected value of the second count value set in advance do not coincide with each other, the arithmetic unit determines that the memory-transfer control unit has a fault, and
wherein, when the third count value and a third expected value indicating an expected value of the third count value set in advance do not coincide with each other, the arithmetic unit determines that the sound data transfer route has a fault.

2. The semiconductor device according to claim 1, wherein the arithmetic unit controls the route switching unit to switch at least one of the unit and the sound data transfer route, which has a fault, to at least one of another unit and another sound data transfer route and starts performing at least one of output and input of the sound data via the external terminals.

3. The semiconductor device according to claim 1, wherein the route switching unit includes:
a route setting register that stores a route setting value indicating an output destination of the sound data; and
a plurality of selectors that switch a transfer route of the sound data on the basis of a value of the route setting value.

4. The semiconductor device according to claim 3, wherein the route setting value is rewritten by the arithmetic unit.

5. The semiconductor device according to claim 1, wherein the second sound data transfer route transfers first recording sound data obtained by recording with a microphone sound output from a speaker via the external terminals, and
wherein the third sound data transfer route transfers second recording sound data generated by looping back the reproduction sound data in the route switching section.

6. The semiconductor device according to claim 5, wherein at least two routes including the second sound data transfer route or at least two routes including the third sound data transfer route are provided.

7. The semiconductor device according to claim 1, wherein a number of all of the sound units and a number of all of the memory transfer control units are considered in setting a number of the sound data transfer routes.

8. A fault detection method in a semiconductor device, the semiconductor device including:
- a processor coupled to a storage device storing instructions for executing:
  - an arithmetic; unit that performs processing for executing a computer program;
  - a plurality of sound units that convert sound data stored in a memory into a serial signal, add sampling frequency information of the sound data to the serial signal, and output the serial signal to a plurality of external terminals, and convert the sound data input from one of the plurality of the external terminals into a parallel signal, add the sampling frequency information of the sound data to the parallel signal, and transfer the parallel signal to the memory; and
  - a plurality of memory transfer control units that control transmission and reception of data between the memory and the plurality of sound units, the fault detection method comprising:
- configuring first to third sound data transfer routes configured by one of the sound units and one of the memory-transfer control units;
- transferring reproduction sound data stored in the memory from the memory to a side of the external terminals via the first sound data transfer route;
- transferring two pieces of recording sound data generated on account of the reproduction sound data from the side of the external terminals to the memory via the second and the third sound data transfer routes;
- comparing, in the arithmetic unit, the reproduction sound data and the two pieces of the recording sound data and detecting a fault in the sound data transfer routes;
- in the plurality of sound units, generating a first count value for measuring a transfer cycle of the sound data;
- in the plurality of memory-transfer control units, generating a second count value for measuring a transfer cycle of the sound data from the sound unit to the memory and a third count value for measuring a transfer cycle of the sound data from the memory to the sound unit; and
- in the arithmetic unit:
  - when the first count value and a first expected value indicating an expected value of the first count value set in advance do not coincide with each other, determining that the sound unit has a fault;
  - when the second count value and a second expected value indicating an expected value of the second count value set in advance do not coincide with each other, determining that the memory-transfer control unit has a fault; and
  - when the third count value and a third expected value indicating an expected value of the third count value set in advance do not coincide with each other, determining that the sound data transfer route has a fault.

9. The fault detecting method according to claim 8, further comprising, in the arithmetic unit, switching at least one of the unit and the sound data transfer route, which has a fault, to at least one of another unit and another sound data transfer route and starting performing at least one of output and input of the sound data via the external terminals.

10. The fault detecting method according to claim 8, wherein the sound data transfer route transfers first recording sound data obtained by recording with a microphone sound data output from a speaker via the external terminals, and
wherein the third sound data transfer route transfers the second recording sound data generated by looping back the reproduction sound data in a route switching section.

11. The fault detecting method according to claim 10, wherein at least two routes of the second sound data transfer route or at least two routes of the third sound data transfer route are provided.

12. The fault detecting method according to claim 8, wherein a number of all of the sound units and a number of all of the memory-transfer control units are considered in setting a number of the sound data transfer routes.

* * * * *